(12) United States Patent
Gaddis et al.

(10) Patent No.: US 7,332,187 B2
(45) Date of Patent: Feb. 19, 2008

(54) FOOD PRODUCT COMPRISING INDIVIDUAL PORTIONS IN A SEGMENTED STRUCTURE

(75) Inventors: Marc A. Gaddis, Marshall, MN (US); David C. Rettey, Tracy, MN (US); Thuy N. Gonzalez, Pearland, TX (US)

(73) Assignee: Schwan's Food Manufacturing, Inc., Marshall, MN (US)

( * ) Notice: Subject to any disclaimer, the term of this patent is extended or adjusted under 35 U.S.C. 154(b) by 814 days.

(21) Appl. No.: 10/429,210

(22) Filed: May 1, 2003

(65) Prior Publication Data

US 2004/0219263 A1    Nov. 4, 2004

(51) Int. Cl.
*A23L 1/10* (2006.01)
*A23D 10/02* (2006.01)

(52) U.S. Cl. .................. 426/94; 426/119; 426/128; 426/549; 426/808

(58) Field of Classification Search .................. 426/94, 426/128, 119, 549, 808
See application file for complete search history.

(56) References Cited

U.S. PATENT DOCUMENTS

| | | |
|---|---|---|
| D212,274 S | 9/1968 | Evans |
| 3,532,510 A | 10/1970 | Zimmerman |
| D231,417 S | 4/1974 | Maiola |
| D284,132 S | 6/1986 | Larson |
| 4,661,361 A | 4/1987 | Mongiello et al. |
| 4,826,697 A | 5/1989 | Ferrero |
| D315,435 S | 3/1991 | Kirkpatrick et al. |
| D341,469 S | 11/1993 | Evenson et al. |
| 5,366,201 A | 11/1994 | Diaz |
| 5,514,397 A | 5/1996 | Shapiro |
| 5,518,746 A | 5/1996 | Diaz |
| 5,756,137 A | 5/1998 | Viviano et al. |
| D404,887 S * | 2/1999 | Prins .......................... D1/129 |
| D429,866 S * | 8/2000 | Zhang et al. ................ D1/121 |
| D439,392 S | 3/2001 | Kauffman et al. |
| 6,203,828 B1 | 3/2001 | Thota et al. |
| D446,903 S * | 8/2001 | Pavan .......................... D1/106 |
| 6,467,398 B2 | 10/2002 | Fink et al. |
| 6,500,475 B1 | 12/2002 | Kraklow et al. |
| D494,733 S * | 8/2004 | Creo .......................... D1/106 |

FOREIGN PATENT DOCUMENTS

| | | |
|---|---|---|
| DE | 86 12 344 | 10/1986 |
| GB | 2 049 537 | 12/1980 |
| GB | 1 600 551 | 10/1981 |
| GB | 2 361 403 | 10/2001 |
| WO | WO 99/44428 | 9/1999 |
| WO | WO 99/66802 | 12/1999 |
| WO | WO 02/17728 A2 | 3/2002 |

\* cited by examiner

*Primary Examiner*—Helen Pratt
(74) *Attorney, Agent, or Firm*—Merchant & Gould P.C.

(57) ABSTRACT

A food product in the form of a connected but random, symmetrical or linear array of food portions can be served as an entree, appetizer dessert or other food. The array is adapted for manual separation and consumption. The food can take any asymmetrical or symmetrical form. The product can have a central portion or location and two or more portions that extend from the central portion that are asymmetrical or symmetrical about the central point. The portions can be filled or topped with fillings or toppings and can be designed for convenient preparation, serving, separation into individual units, and consumption by hand. The food can be uncooked, par-fried, par-baked, baked, fried, etc.

60 Claims, 4 Drawing Sheets

FOOD PRODUCT COMPRISING INDIVIDUAL PORTIONS IN A SEGMENTED STRUCTURE

FIELD OF THE INVENTION

The invention relates to food units in segmented but connected structures. The food units that can be in the form of sized portions such as appetizers, snacks or dessert; larger servings such as lunch or dinner portions, or still larger portions that can be shared or divided into other food units. The portion generally relates to an easily cooked portion defined by dough envelope surrounding a food. The food unit is divided in segments connected to other portion segments. The segments can be manually separated into individual serving portions and easily consumed by hand. The invention relates to an uncooked, parfried, or parbaked segmented product that is finished at the consumption location. The product can be formulated in a number of cooking styles including Oriental, Mexican or Spanish, American traditional, South Asian, or other style. The food can be cooked at a consumption location using microwave energy, deep-frying, baking, convection or other heat source.

BACKGROUND OF THE INVENTION

Foods that combine careful, appealing presentation with well-formulated and tasty ingredients are always attractive to consumers. Such a product, having a design that is easy to cook and eat, is an important goal for today's food industry. Single serving and multiple serving foods in the form of snacks, appetizers, desserts, single entrees or multiple entrees using varied food technologies have been a common focus for current food research and development efforts. A number of conveniently configured foods, in the restaurant and retail industries, have been offered including such products as hot pockets, individual pizza slices, appetizer offerings, dessert products and others. The product designs of certain of these foods are shown in Evans, U.S. Design Pat. No. 212,274; Maiola, U.S. Design Pat. No. 231,417; Larson, U.S. Design Pat. No. 284,132; Kirkpatrick, U.S. Design Pat. No. 315,435; Evanson et al., U.S. Design Pat. No. 341,469 and Kauffman et al., U.S. Design Pat. No. 439,392. The foods that are the focus of this art are single serving, and at most two serving size portions. We believe a substantial unfilled need exists in this art for new food formats that can satisfy consumer's demands for attractive and tasty offerings.

BRIEF DISCUSSION OF THE INVENTION

We have found a unique food product design that combines an attractive decorative appearance, an easily manufactured product format, an easily handled product format, a product format that is easily cooked and served and a product format that comprises a pleasing flavor with a convenient product configuration for the end consumer. The food product design comprises an array of portions in a product. A dough or crust envelope surrounding a filling or topping material defines the portions in the product. One aspect of the food product comprises a segmented food format having three or more food portions in an array of connected but separable units. In this disclosure, the array of separable units simply indicates that individual serving size portions of food are produced in a unitary product that can be divided or split into separate units for individual consumption. Each individual portion in the product can vary in size from small appetizer portions to larger dinner size portions that can also be further divided into portions that can be shared. A second aspect of the invention is a food product in a symmetrical array of separable portions. Such a symmetrical array indicates that the separable units are arrayed in a symmetrical form around a center point. The center point can be simply a point in the center of the unit or can be the center of a central portion. Such symmetrical units can be an array of three units in a linear structure, three units in a structure that has a rotational symmetry, four units having a rotational symmetry or five units, a central unit surrounded by four units in a form surrounding the central point, seven units, a central unit surrounded by six units in a form surrounding the central point, all in a rotationally symmetrical form. The symmetrical product can have a linear symmetry, a planar symmetry or symmetry with a central point having an array pf portions surrounding the central point. Each individual separable portion or separable food unit is defined generally by a portion or envelope of the crust or dough surrounding the units that are designed for ease of separation such that each unit can be separated from the other at point of consumption. The separable units or separable portions are arranged in or are symmetrical about a central point formed in the central portion. The central point or portion can comprise either a filled food product or a separation location for the portions in the segmented or segmented symmetrical product.

A further aspect of the invention includes a food product that has a central filled portion and two or more extended portions, the extended portions comprising a filled food portion.

Lastly, the invention contemplates a product offering in which the two or more food products are stacked in a "not in registration" configuration and presented to the consuming individuals. In this disclosure, the term "not in registration" indicates that the extended portions of the food product do not substantially overlap adjacent extended portions but, viewed from above, each food portion reveals at least a part of any extended portion in the food product found next adjacent below the food portion. In such a configuration, two, three or more of the food portions can be stacked in an attractive decorative fashion and, optionally be combined with additional food materials applied to the stack configuration. Such food materials can be cheeses, sweet toppings, sweet sauces including chocolate, caramel, etc., tomato sauces, Mexican salsa, Italian sausages, Oriental sauces such as sweet and sour or hot spicy Oriental sauces, or others. Once presented to the consumer, the food product or each level of the product, in the stacked configuration, can be separated by hand and consumed individually. In one preferred mode, the food product of the invention can comprise a bottom layer of dough supporting individual formations of a filling or topping portion that is, in turn, covered by a second layer of dough. The second layer of dough is then adhered to the first layer, segregating each individual filling or topping portion into an individual filling zone in the symmetrical food product of the invention. This product can be made entirely of raw dough, can be frozen and shipped, can be parfried, parbaked, frozen and shipped for final consumption. The product, when consumed, can be deep fried, exposed to microwave energy, baked in thermal or convection ovens or any other convenient cooking equipment.

BRIEF DESCRIPTION OF THE DRAWINGS

FIG. 1 shows an array, in a symmetrical form around a central unit. FIGS. 4-5 show cooked and uncooked versions of the food in a symmetrical form.

DETAILED DESCRIPTION OF THE INVENTION

Figure 1:
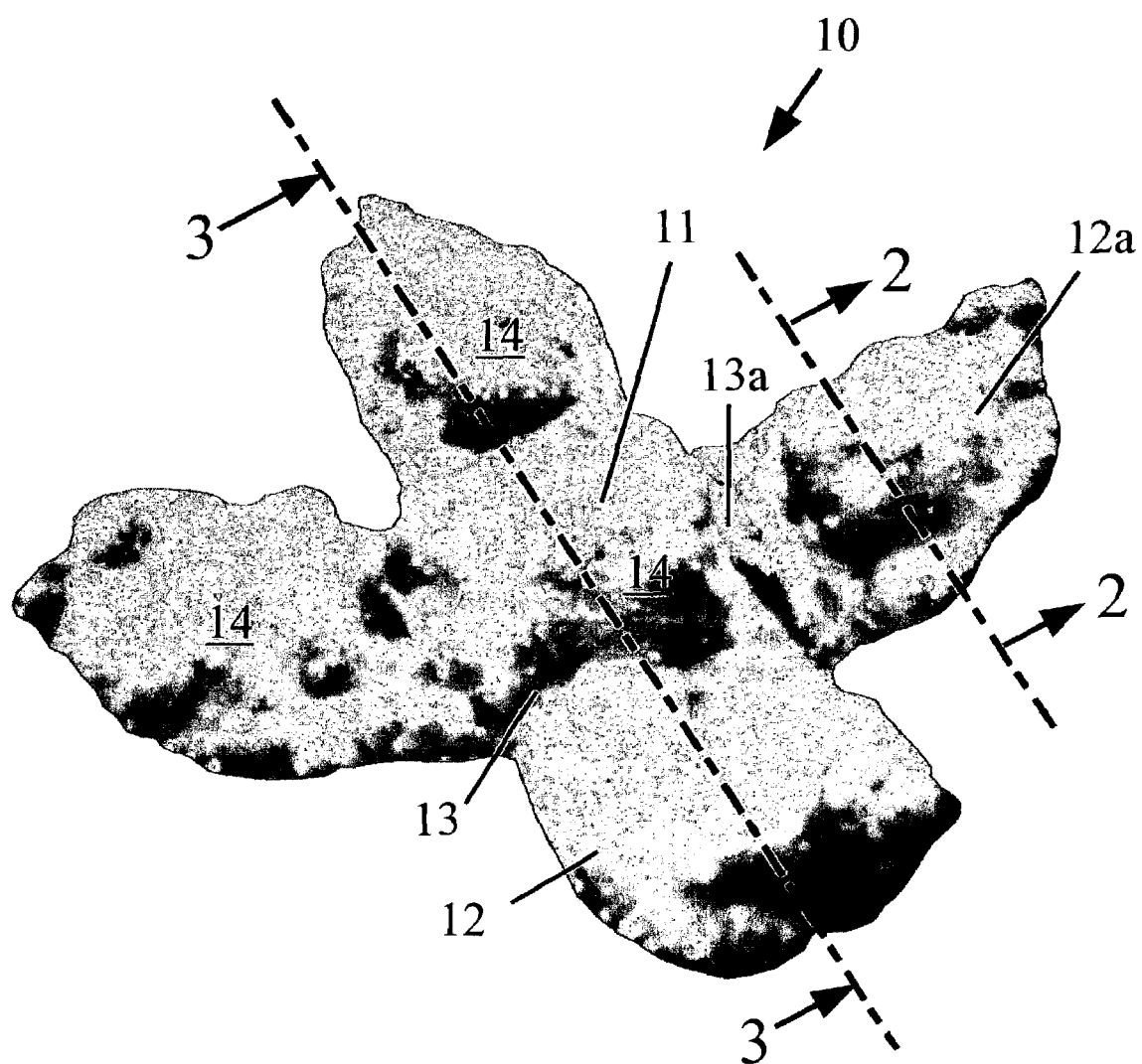
FIGS. 1, 4 and 5 are photographic representations of the segmented food of the invention.

The food of the invention comprises a product in the form of a segmented array of individual portions defined by a dough or crust envelope. The array can be linear, random or symmetrical in shape. The symmetry can be bilateral, four fold, six fold, etc. The individual serving size portions can have a variety of sizes from small appetizer sizes to larger dinner size portions that can, in turn, be divided into further portions. In this embodiment, a portion can be removed from the array and, even though it is a unitary portion, can be sliced or divided into portions that can be shared at a point of consumption. Such portions or subdivided parts of the portions can be combined with dips, sauces, other condiments or other components. The food typically comprises at least one edible layer (crust or dough) and three or more portions of a topping or filling.

Briefly, the individual food portions of the invention typically include at least one crust or dough layer combined with a topping or filling layer. Three or more portions are combined in the segmented food. The food can comprise three, four, five, six, seven, eight or more connected, segmented, but removable portions. The food can comprise a food formed in a crust envelope enclosing the fillings or toppings within a crust or dough envelope surrounding the individual portions. The portions are arrayed as discussed above in an array that is both pleasing to the consumer and useful in product preparation. The product can be made raw but its size and shape are adapted to be deep fried, thermally cooked, microwave cooked, convection cooked or combinations thereof. The product can be raw, steamed, parbaked, parfried or otherwise readied for preparation. The food after cooking, the food can be non-planar. The effect of heating can introduce an attractive aspect into the product overall appearance. The extended portions can obtain a curved aspect similar to the petals of a flower. A line that extends from the center of an adjacent portion of the food through the center of the food to the center of an opposite adjacent portion can define a curved line segment. The food product can attain a convenient size for cooking, serving and consumption. The major dimension of the food can be less than 25 cm, less than 20 cm or less than 15 cm. The mass of the food can be less than 1000 grams, less than 750 grams. The food is often sized to easily fit into a fryer basket, an oven cavity, or a steam basket.

The product can be a sweet product consumed for dessert, as a sweet appetizer, as a breakfast bread or sweet roll or can include fruit or other sweet preparations. The product can also include savory fillings that can be tomato based, meat based, can have Mexican or Tejano flavorings, can be Oriental or South Asian, can be pizza flavored or any other product characteristic.

Apart from the reheat stability of the fillings, the major goals to be achieved are taste and texture and the selection of fillings or toppings. The fillings can be sweet or savory and can include tomato sauce or paste, cheese, spices, and optional meat ingredients completing the filling. Typical tomato concentrates, pastes or sauces are used as a base component combined with other solid ingredients such as cheese, meats, prepared meats and herbs. Ingredients that can complete the pizza sauce components include thickeners such as starches, non-fat dry milk, oil, chopped vegetables and other conventional ingredients. Meat components of the filling include conventional pizza ingredients including sausage, Italian sausage, pepperoni, ham, ground beef, chicken portions and other conventional meat ingredients formed in convenient product sizes for use in filling recipes. The cheese component for use in the pizza portions of the invention includes mozzarella cheeses, jack cheeses, American cheese, Swiss cheese and other common cheese products.

The food of the invention can be made in a variety of culinary styles including an Italian style, a Vegetarian style, a Southwest style, a Mexican style, a Tex-Mex style, Tejano, a Greek style, a Hawaiian style, Oriental style (Japanese or Chinese), Southeast Asian (e.g., Vietnamese), South Asian (Indian, Pakistani, Indonesian, Thai) cuisine and other common food styles. An Italian style food typically comprises tomato sauce, pepperoni or Italian sausage, mozzarella cheese and Italian seasonings including oregano, garlic, etc. A Vegetarian style food typically comprises tomatoes, onions, mushrooms, green or black olives and seasonings. A Southwest style, Tex-Mex, Tejano or Mexican style food typically comprises tomatoes, chilies, onions, jack cheese, shredded beef or chicken, cilantro and other common flavorings. A Greek style food typically comprises feta cheese, cucumbers, onions, cream fillings, lamb and typical gyros-type foods. A Hawaiian style food typically comprises ham, pineapple, macadamia nuts, etc. As such, a different dough, for each style of food, can be used in each separate edible layer of the food. These foods styles can be made in the form of snacks, appetizers, desserts, single entrees or multiple entrees using the invention food technologies.

The dough useful in making the segmented food of the invention is typical light dough capable of commercial mixing, blending, sheeting and processing required to form the enclosed pizza slice. One preferred embodiment of the dough of the invention is a light croissant-type dough providing a rich, flaky, light character that can survive manufacture, parbaking, parfrying, baking, packaging, freezing and preparation at home resulting in an attractive appetizing segmented food. Other doughs can be selected according to the requirements of the pizza style selected by the manufacturer. Conventional bread dough, pizza doughs and croissant doughs are well known and can be adapted for ease of manufacture. One preferred dough for use in making the segmented food of the invention includes dough that is adapted to be parfried, fried in the manufacturing sequence. In such a product, the dough and fillings can be assembled into the segmented food and can be parfried during production. Fried and par fried dough can be light, crispy and crunchy. Alternatively, the raw dough and filling can be frozen and shipped to an end use location where it can be deep fried until ready for serving. Alternatively, the product can be parfried before final frying. The parfried product can also be baked or microwave cooked at the end use location.

The food of the invention is manufactured in a process wherein the dough is selected for the segmented food of the invention. A variety of dough process, formulation or recipes can be used. The following is preferred. The ingredients are typically added to the mixer at appropriate amounts and intervals and mixers are typically operated until the dough is well developed but not overworked. Dough is typically maintained at a temperature convenient for mixing and for sheeting. Once the dough is developed and at the right temperature, the dough is added to a sheeting line in portions appropriate for the equipment selected. The dough is processed and then laminated by adding an appropriate laminating fat to the sheeted dough at an amount of about 5 to about 25 wt % based on the dough using conventional fat addition equipment. Typically, a conventional baker's margarine is used. The sheeting equipment is operated to reduce the thickness of the dough sheet and to produce a laminated dough sheet having 9 to 100 layers of the dough, preferably 7 to 40 layers of the dough, typically 8 to 40 layers of dough. Once fully laminated, the dough is reduced in thickness to obtain the appropriate weight per square inch to meet product tolerances as discussed below. One or more thickness reduction steps may be required to obtain a final dough weight. Once the dough is the appropriate thickness, the dough sheet is then split, cut or processed into a base and top layer sheets.

The food of the invention typically is made by combining the fillings or toppings onto a base sheet of dough. Over the added fillings or toppings is placed a top sheet of dough to fully cover and surround the toppings. The base and top layer sheets are combined in the final product by adhering the perimeter of the segmented portions to form a seal on the perimeter of the food. At this stage in the process, a layer of water aqueous starch, gum, flour, or mixtures thereof, etc. can be applied to the base dough sheet to ensure proper sealing of the sealing layer to the base layer. This water is important to ensure that the final perimeter seal is mechanically stable and the filling will not leak from the finished product upon baking in the manufacturing facility, during reheating by the consumer and during consumption by the end user. The filling is deposited on the base dough sheet; a filling depositing applicator is used to place the filling on the dough base layer. The top layer is then placed over the bottom dough sheet and the filling and the moistened edges. Power driven equipment is then used to seal the portion of the food that will result in segmented food. Power driven pressing rollers or guillotine pressing stamp equipment can apply sufficient pressure with sufficient numbers of pressing steps to ensure that the sealing layer is adhered to the moistened base layer sufficiently to ensure the layer is mechanically stable during subsequent operations during manufacture and subsequent baking or freezing at the end location.

The food is defined into portions by means to separate the portions form the food. Means to separate include any structure that can produce a separation of one portion from an adjacent portion. The means to separate comprises a score line or a line of perforations, a zone of reduced strength or preferential breakage, a mechanical attachment having a portion that can break or divide easily and before the failure of the food materials.

The segmented food can be baked, parbaked or parfried at a sufficient temperature for a sufficient period of time to cook the filling and to cool the exterior dough sufficiently. The segmented product of this invention is designed to be either cooked or reheated at the consumption location. In one embodiment, the segmented food of the invention can be fully baked and thoroughly cooked for subsequent microwave reheating when used; However, a preferred mode of use of the segmented food of the invention is to take a frozen segmented food of the invention that comprises either a raw unit or a parbaked or parfried unit and then complete the cooking of the segmented food. The raw frozen unit can be reheated for cooking completion in a fryer, conventional oven, convection oven, microwave oven or combination thereof for final cooking. Further, the raw food can be placed in a deep fat fryer for final cooking purposes. Alternatively, the segmented food of the invention can be parbaked or parfried and then finished at a consumption location by baking, frying, microwave cooking or a combination thereof. Once complete, the product can then be enhanced with a variety of ingredients including products that can enhance the attractiveness of the baked material. The product is then quick frozen at a temperature substantially below the freezing point of water for sufficient time to ensure that the interior of the filling is frozen before wrapping. The product is then combined with an appropriate packaging designed to maintain the overall shape of the product and to protect the segmented food from breaking or other damage.

The segmented food of the invention is adapted to be separated into individual serving portions by breaking or dividing the food into three or more portions at a separation zone between the filled portions. Since the product is designed for easy separation, a packaging that protects the segmented food from breakage during storage, transportation and product preparation is important. The packaging of the invention is a packaging that surrounds each individual segmented food and supports the food at its separation zone to prevent the unintended separation of the food portions. In one embodiment of the packaging of the invention, a deep drawn plastic tray can be prepared substantially enclosing the shape of the segmented unit either in a linear or symmetrical array. One segmented food of the invention can be placed into the packaging which is supported then by the bottom surface of the deep drawn plastic tray. A second segmented food of the invention can be placed on the first. The foods can be in direct contact or can be separated by a sheet of paper or plastic separating the food units. Thicker, more protective sheeting can be used including film plastic, corrugated paper board, corrugated plastic inserts, etc. can separate the individual portions. One value of a substantially linear separating unit is the support obtained from the separating units by the next adjacent segmented food unit positioned above the separator. Such a packaging system can contain two, three, four or more of the segmented units of the invention in a stacked form. Once the packaging tray is filled with food items and separator layers, the packaging can then be wrapped appropriately and placed in shipment cartons or containers.

The segmented food of the invention can be manufactured by first sheeting a laminated dough layer to a thickness of less than about 3 millimeters. Onto that sheet is placed in accurate registration, areas of filling or topping in a regular pattern. Onto the dough sheet containing the carefully placed filling portions is placed a second sheet of dough coextensive with the first. Prior to the addition of the second dough sheet, the first dough sheet can be moistened with water, aqueous starch, flour gum or mixtures thereof, etc., to promote dough adhesion. The areas between the fillings are compressed such that the areas of dough containing no filling are pressed together to form the seal surrounding the filling. The seal can be maintained by a variety of compression techniques, however, a preferred technique involves use of a die adapted to the shape of the segmented food and filling add-on. The die can compress the zones between the filling portions to form a pattern of the individual serving size portions in the compressed dough sheet. The compression step can be conducted one or more times to ensure that the dough layers are satisfactorily compressed to obtain a reliable joint. Once the compression step(s) are complete, the individual serving size portions are separated using a cutting step. The compression and cutting function can be combined into a single stage wherein the dough is compressed, the periphery of the segmented food is sealed and the segmented foods can be separated by cutting between the sealed periphery of the segmented portions. Any cutting implement can be used to divide the dough portions, however, the preferred cutting implement comprises a tool that presses the joint between the filling portions in compression as the implement passes through the dough layers leaving the sealed edges. As such, the dough is separated by the pressure of the dividing implement. This separation technique improves the sealing aspect of the perimeter of the individual serving size pizza slice portions.

Once the individual segmented serving size portions are divided, they can be used raw, can be fried or baked at the manufacturing facility for a period of time of about 1 to 30 minutes or 3 to 10 minutes at 350° F. to 550° F., depending on size and shape. After completely cooking and leaving a pleasing golden brown appearance, the cooked individual serving size portions are then quickly frozen to an equilibrated temperature of about 0° F. or below and then are packaged in the unique packaging and then shrink-wrapped in conventional clear film enclosure with an appropriate label and cooking instructions.

Conventional, typically transparent, translucent or opaque film packaging can be used with adhered labels or labeling information printed directly onto the film package. Further, package inserts can be used as labeling information as well. Typical film packaging can include films made from commonly available polymeric materials including polyolefin such as polyethylene and polypropylene, polystyrene, polyester, polyvinylchloride and other commercially available film materials. Single or multilevel films can be used to obtain protection from the film and protection from the permeation of undesirable materials from the exterior to the interior of the package and to prevent moisture from leaving the package resulting in a dry undesirable product. Further, the packaging can prevent loss of flavor and other desirable flavor notes from the interior of the package. Such packaging can be closed using compression technology, adhesive technology or thermal technology for sealing the seams and edges of the formed packaging material.

When prepared for consumption at a final use location, the food is typically heated until it is satisfactory for use. In the case of a fully cooked segmented food item, the preparer simply reheats the cooked, but frozen item to a final cooking temperature. In such a case, the material is heated in a fryer, conventional oven, convection oven, microwave oven or combinations thereof until the contents are heated to a temperature of at least 160° F. for a substantial period of time. The food item is then served hot with sauces, condiments, toppings or other dipping materials for consumption. Alternatively, the segmented food can be provided in a raw, parfried or parbaked form. Such a form requires more careful preparation to ensure that the food is fully cooked before serving. Such an alternative is introduced into a thermal oven, convection oven, microwave oven or deep fat fryer to obtain a final product. In such a cooking preparation, the food is exposed to temperatures in the oven or in the oil in a range of about 300-500° F. for a sufficient period of time to complete cooking of the raw dough, the parfried or parbaked dough and the interior filling. Desirably, cooking conditions are adjusted to obtain a crispy crunchy exterior with a fully cooked interior filling or topping. Such cooking process typically can take anywhere from two to ten minutes depending on the size of the segmented food, the temperature of the oven or cooking oil and the initial temperature of the food.

The segmented product of the invention can be manufactured from laminated or non-laminated dough. If laminated dough is used, the preparation is initiated by first sheeting a laminated dough layer (4 to 64 or more layers) to a thickness of less than about 3 millimeters. Onto that laminated or non-laminated sheet is placed in accurate registration, areas of filling in a regular pattern such as that shown in FIG. 4. Onto the dough sheet containing carefully placed filling portions is placed a second sheet of dough co-extensive with the first. Prior to the addition of the second dough sheet, the first dough sheet can be moistened with water or adhesive material to promote dough adhesion. The fillings are positioned such that they are within the envelope, formed by the second sheet, of the product after manufacture. The product is then cut and the edges of the envelope are compressed to form the segmented food of the invention. The shape of the segmented article can be obtained and the seal can be executed by a variety of techniques. An important technique involves use of a die adapted to the shape of the segmented pattern of the food. The die both cuts the dough into the appropriate shape and secondly, forms the seal around the filling or topping materials with the food product. The die can also introduce the areas between the portions designed to permit easy removal of one portion from the segmented product. As such, the die can introduce a series of perforations, a scored line; introduce a material that weakens the dough at the correct position between portions or any other means to promote easy removal of a portion from the segmented product. The cutting compression step can be conducted one or more times to ensure that the dough layers are satisfactorily compressed to obtain a reliable seal or joint between the dough layers. The resulting product comprises the segmented food product having individually defined filling portions surrounded by a dough envelope. The segmented food having, between portions, means to separate the portions for consumption purposes.

Once the segmented food products are cut, they can be frozen in an uncooked form, parfried, parbaked or baked or fried to a finished characteristic. In parfrying processes, the product is introduced into cooking oil at a temperature of about 150 to 210° C. for about 15 to 90 seconds. In a parbaked product, the material is introduced into a baking zone at a temperature of about 150 to 280° C. for 1 to 15 minutes to introduce a parbaked character. To fully bake the product after initial manufacture, the product is inserted into a baking zone at a temperature of about 150 to 280° C. for 5 to 30 minutes to fully bake the product. The product can be fully cooked by deep fat frying, by introducing the segmented product into a frying bath at a temperature of about 150 to 210° C. for about 10 to 90 seconds.

The uncooked parbaked or parfried individual segmented food items can be removed from packaging if necessary and then reheated or cooked at a location for serving. When cooked for serving, the uncooked parbaked or parfried materials can be completed in a microwave oven, by baking in a thermal oven, by frying in a deep fat fryer or other cooking methods or combinations thereof. When fried, one important aspect of the invention is that two or more of the segmented foods of the invention can be introduced into a fry basket immersed in oil and fried simultaneously. Such a processing can aid in forming the stacked unregistered food product. Combined frying can introduce bonds between the segmented foods that can maintain stability of the foods when served. Once cooking is completed, the individual segmented food products can be served individually or can be stacked and served in a decorative fashion. Further, the simultaneously fried products can be separated if desired, or served in the form obtained during frying.

DETAILED DESCRIPTION OF THE DRAWINGS

FIG. 1 is a photographic representation of a food product comprising five separate but interconnected portions. In FIG. 1, the central portion 11 is shown in connection to extended portions 12 and that extend from the central portion 11. Each extended portion 12 is so connected to the central portion 11 through a separation zone 13 that, in this cooked embodiment lies between the zones for filling 14 that are an important part of each of the central and extended portions. The segment of food in FIG. 1 has been sized for serving two or more consumers and is configured for an appetizer size portion. A partial removal of an extended portion at a breakage line 13 is shown that partially separates extended portion 12 from center portion 11 at the break 13.

Figure 2:
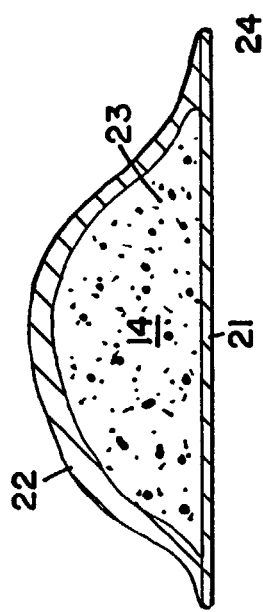
FIGS. 2 and 3 are cross sections of the food of FIG. 1 showing the individual serving portions defined by the dough envelope and the relationship of the extended portions and the central portions.

FIG. 2 is a graphical representation of a cross section as shown in FIG. 1 of the segmented food product 10 as shown. FIG. 2 shows a cross section of the zone for filling 14. The zone for filling 14 is made using a base dough or crust layer 21 and a top or covering layer 22. The bottom dough layer 21 and the top dough layer 22 are joined at compressed adhesion zones 24 which serves to bond the top layer 22 to the bottom layer 21. The zone for filling 14 includes a filling 23 that is wholly enclosed by the envelope comprising the bottom layer 21 and the top layer 22. The filling 23 is maintained within the food item by the scaled periphery formed by the compressed adhesion zones 24.

Figure 3:
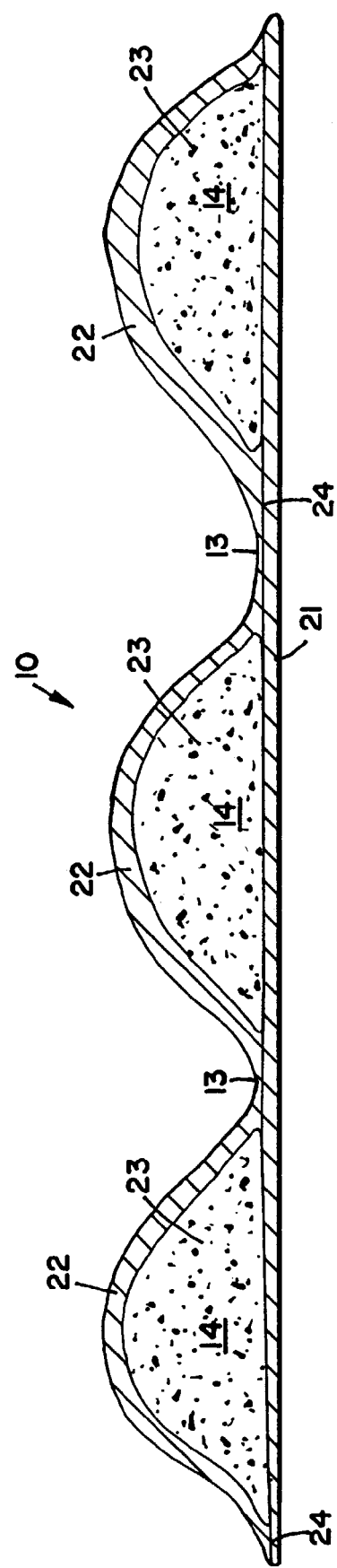

FIG. 3 is a cross section of the central portion and the extended portions 14 in the segmented food 10 of FIG. 1. The cross section is as shown in FIG. 1. In FIG. 3, similar to that shown in FIG. 2, is shown a segmented food having three segmented zones for filling 14. The zones of filling 14 are formed on a bottom or base dough layer 21. The zones for filling are defined by the top dough layer 22 which overlays the zones for filling and are adhered to the bottom layer 21 at compressed adhesion zones 24. The central and extended portions are defined by the separation zones 13 that result when the dough is adhered in the overall structure by compressing the top dough layer 22 into the bottom dough layer 21 during manufacture. The segmented food 10 shown in FIG. 3 can be divided into three equal portions at the separation zones 13 simply by mechanically removing the portions at the separation zone.

Figure 4:
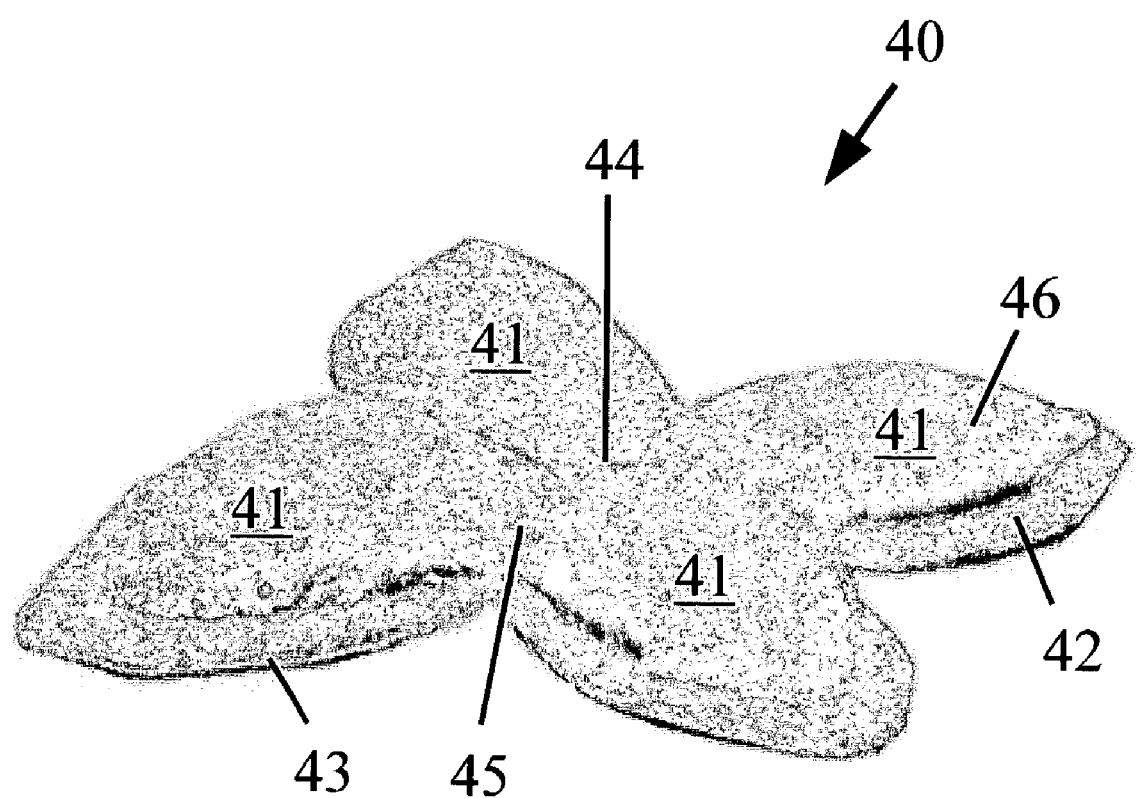

FIG. 4 is a photographic representation of a raw segmented food 40 of the invention. The segmented food 40 is symmetrical in a four-way rotation mode about a central point 44 at the joint between the filled zones 41 of the food 40. The filled zones 41 are defined by the compressed zones 42 that joins the bottom dough layer 43 to the top dough layer 46. Each of the filling zones 41 are surrounded by a compression zone 42. A separation zone 45 also is formed between the filling zones 41 at the compressed zones 42 that fall between the filled zones 41. The difference between the compressed zones 42 and the separation zones 45 relates to placement. The separation zones lie between the filled zones 41 while the compression zones lie on the periphery of the segmented food apart from the areas between the filling zones 41.

Figure 5:
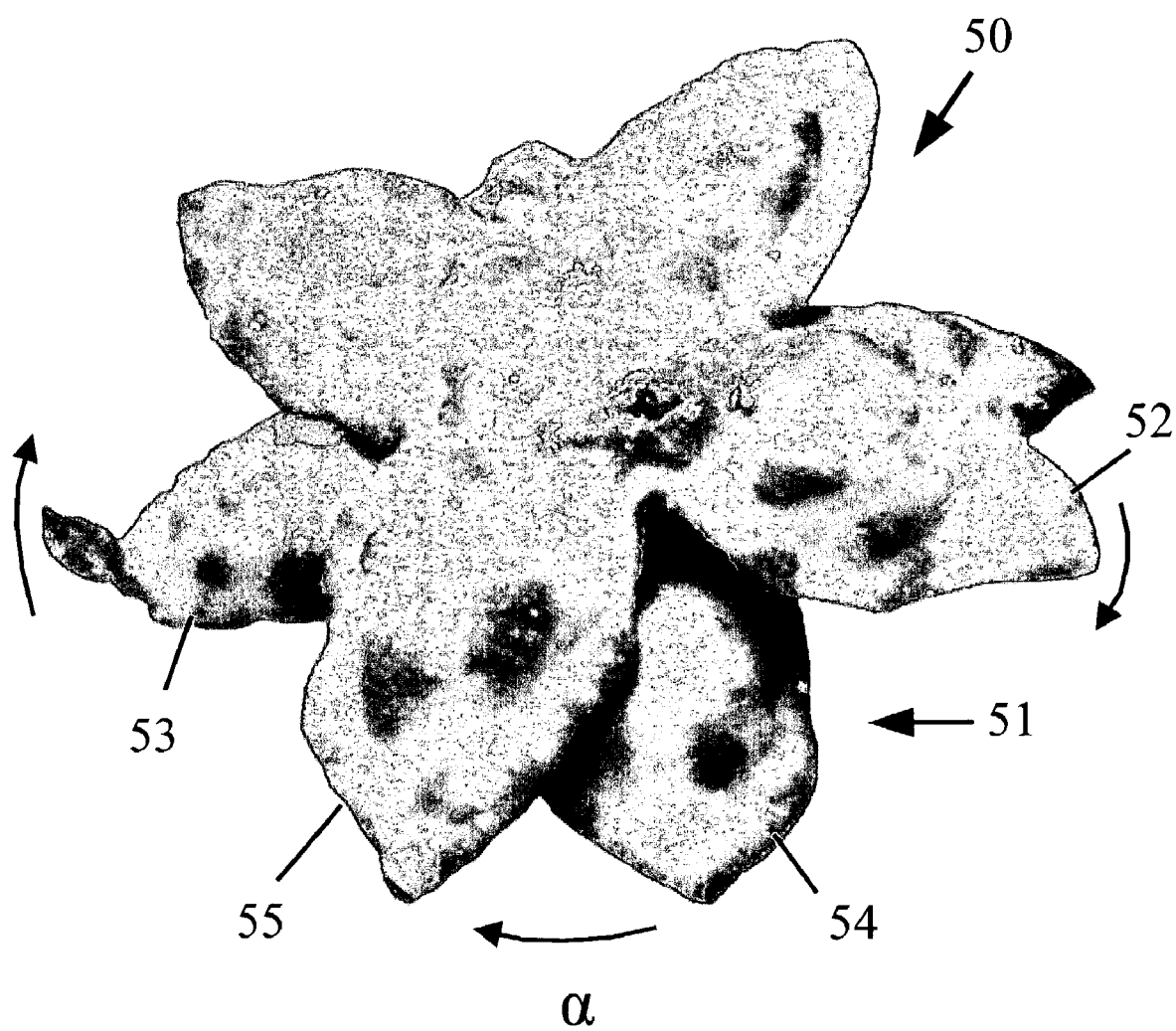

FIG. 5 shows two substantially symmetrical segmented foods 50 and 51 of the invention in a stacked non-registered form. For the purpose of this disclosure, the term "non-registered" means that, with respect to an extended portion of one segmented food to a second extended portion of a segmented food, that they do not lie directly one upon the other. Non-registration means that when stacked, at least a portion of the lower extended portion 51 is visible beneath the next adjacent extended portion 55. This stacking aspect of the segmented foods of the invention is an important aspect for consumer attractiveness. Two, three or more of the segmented food items of the invention can be stacked in an attractive fashion. Such stacked segmented foods can comprise different but complimentary flavors. In FIG. 5, a first segmented food 50 is stacked upon a second segmented food 51. As is shown in the Figure, the top segmented food 50 is rotated with respect to the bottom-segmented food 51 such that, for example, extended portion 54 is revealed beneath extended portion 55. The degree of rotation of the symmetrical unit 55 shown at angle α provides the lack of registration and the revealed form of extended portion 54. Further, the non-planar aspect of the invention is also shown in FIG. 5. For example, extended portion 52 embodies an extended portion 52 that is rotated from the plane of the segmented food 50 such that the filled portion lies, in a curvilinear form, below the plane of the segmented food 50. This is particularly marked when compared to the uncooked material that is essentially substantially flat when made. During cooking, some alteration in the planarity of the food item occurs, however, the degree of departure of the position of extended portion 52 is in excess of the distortion of the food item that is obtained from cooking. Further, the extended portion 53 extends above this non-planar aspect of the segmented foods of the invention enables the extended portions that depart from planarity aid in helping to maintain the stability of the stacked segmented food articles. Further, the distortion resulting from cooking and the tendency for the extended portions to be curved up, down or to depart from planarity further, adds a decorative character to the individual portions and to the portions when stacked.

DESCRIPTION OF A PREFERRED EMBODIMENT

Process and Formulation Outline

Standard mixing equipment was used for the food. A segmented food, substantially as shown in FIG. 1, was prepared from the following dough formulation and filling formulation.

| FRIABLE DOUGH FORMULATION 1 | | |
|---|---|---|
| INGREDIENT | PERCENT (%) | BAKERS (%) |
| Flour Unbleached Enrich | 46.16 | 94.99 |
| HYLON VII Starch | 2.43 | 5.01 |
| Water (T = 90-95° F.) | 28.34 | 58.32 |
| Concentrate (see Table I) | 16.20 | 33.33 |
| Soybean Veg. Oil | 5.78 | 11.90 |
| Yeast, Dry Active | 0.46 | 0.94 |
| Baking Powder, Single-Acting | 0.37 | 0.76 |
| Garlic Powder | 0.25 | 0.51 |

Mixing Instructions:
1. Weight water, T=90-95° F.
2. Add yeast; mix to make slurry
3. Add oil; mix
4. Add flour, conc., Hylon VII, baking powder and garlic power to mixing bowl.

5. Mix dough on Speed 1 until becomes a homogenous mass (approx. 3 min.); stop mixer after 1 minute to scrape down sides of mixing bowl.
6. Mix dough on Speed 1.75 until it is fully developed (approx. 11 minutes).
7. Final dough temperature=85-90° F.

Sheeting Instructions:
1. Sheet half of the dough using the following reduction curve (in mm)
   12-10*-8-6*-5-4*-3-2-2-1.5-1.5
   * rotate dough piece one quarter turn before next reduction
2. Repeat for second half of dough
   Dock dough sheet Bake Time and Temperature: 4½ min @ 200° F. in an impingement oven

DOUGH FORMULATION 2

| Ingredient | Bakers % |
| --- | --- |
| Flour unbleached enrich bulk 12.2 | 94.99 |
| HYLON VII Starch | 5.01 |
| Water (Temp: 180° F.) | 58.32 |
| Concentrate 1 | 33.33 |
| Shortening | 11.90 |
| Garlic powder | 0.51 |

Mixing Instructions:
1. Weigh water in temperature: 180° F.
2. Add flour, concentrate, HYLON VII starch, shortening and garlic powder to mixing bowl
3. Add water into the dry mix
4. Mix dough on 3 mins. low speed and 11 mins. high speed in mixer or until it is fully developed.
5. Final dough temperature: 85-105° F.

Sheeting Instructions:
   Sheet in RollFix (Large).

TABLE I

CONCENTRATE 1
TERIYAKI BEEF

| INGREDIENT | FILLING FORMULA (%) |
| --- | --- |
| TVP 2000-10C | 6.00 |
| Instant Brown Rice | 7.00 |
| Mushroom, Chopped | 13.00 |
| Green Onions, IQF | 4.00 |
| Waterchestnuts, IQF | 10.00 |
| Ginger, Chopped | 0.50 |
| MIX FOR 1-2 MINUTES OR UNTIL BLENDED | |
| "SCE SOY KIKKOMAN" | 6.50 |
| Vinegar | 1.00 |
| Sesame seed flavored oil | 1.50 |
| Wine Cooking | 2.00 |
| Mushroom, soy sauce | 1.00 |
| MIX FOR 1-2 MINUTES OR UNTIL BLENDED | |
| "BEEF GRD SEASONED IQF" | 18.55 |
| Red Bell Pepper, IQF | 8.00 |
| Green Bell Pepper, IQF | 7.00 |
| "ONION ⅜" DCD IQF" | 6.00 |
| MIX FOR 1-2 MINUTES OR UNTIL BLENDED | |
| Sugar | 4.10 |
| Salt | 0.65 |

TABLE I-continued

CONCENTRATE 1
TERIYAKI BEEF

| INGREDIENT | FILLING FORMULA (%) |
| --- | --- |
| Garlic Powder | 0.35 |
| I + G | 0.10 |
| Clearjel | 2.40 |
| Onion Powder | 0.35 |
| MIX FOR 1-2 MINUTES OR UNTIL BLENDED | |
| TOTAL | 100.00 |

Mixing Procedures:

After filling is mixed, hold the filling for at least 30 minutes to allow for rice to hydrate before use.

CONCENTRATE 2
SOUTHWEST CHICKEN

| INGREDIENT | FORMULA (Parts by Weight) |
| --- | --- |
| "CHIC CKD WHITE ½" IQF" | 404.00 |
| "TVP US 3000 NONFORTIFIED" | 120.00 |
| WATER | 120.00 |
| "ONION ⅜" DCD IQF" | 216.00 |
| "ONION GRN SLC ¼" IQF" | 100.00 |
| "PEPPER RED/GRN ¼" DCD IQF" | 340.00 |
| FLAV CHIPOTLE CONC | 86.00 |
| "SCE CHS MONTEREY JACK" | 160.00 |
| "CHS MONTEREY JACK SHREDDED" | 200.00 |
| "CHS CHED SHARP HI-MELT PROCESS" | 200.00 |
| ADD INGREDIENTS AND MIX FOR 1-2 MINUTES OR UNTIL BLENDED | |
| "CUMIN GROUND" | 4.00 |
| PEPPER CAYENNE GRD 40 SHU | 2.00 |
| "GARLIC POWDER" | 3.00 |
| CLEARJEL | 12.00 |
| SALT | 17.00 |
| FIRMTEX STARCH | 16.00 |
| MIX SPICES TOGETHER FIRST AND ADD TO MIX. MIX FOR 1-2 MINUTES OR UNTIL BLENDED | |
| TOTAL | 2000.00 |

If filling particle size is too large, chop filling or chicken to desired particle size.

The above discussion, recipes, process information handed disclosure provides a basis for understanding the meets and bounds of the invention and discloses a preferred embodiment. However, since many embodiments of the invention can be made without departing from the spirit and scope of the invention, the invention resides in the claims hereinafter appended.

We claim:

1. A food comprising a center portion and a substantially radially symmetrical segmented array of three or more attached and contiguous extended portions extending from the center portion, the food comprising an edible dough envelope and one or more layers of filling present substantially only within the attached extended portions, each extended portion defined by a radially symmetrical means to separate the extended portion from the food, wherein the means to separate comprises one or more score line or lines of perforations.

2. The food of claim 1 wherein the means to separate comprises a zone of reduced strength or preferential breakage.

3. The food of claim 1 wherein the food comprises four or more attached and contiguous extended portions.

4. The food of claim 3 wherein the edible dough envelope comprises two layers of dough; wherein the layers edges are sealed form the edible envelope for the filling.

5. The food of claim 1 wherein the food is a raw food.

6. The food of claim 1 wherein the food is a par-baked food.

7. The food of claim 1 wherein the food is a steamed food.

8. The food of claim 1 wherein the food is a par-fried food.

9. The food of claim 1 wherein there are five portions.

10. The food of claim 1 wherein there are six portions.

11. The food of claim 1 wherein there are seven portions.

12. The food of claim 1 wherein there are eight portions.

13. The food of claim 1 wherein, after cooking, the extended portions are curvilinear, such that a line that extends from the center of an adjacent portion of the food through the center of the food to the center of an opposite adjacent portion can define a curved line segment.

14. The food of claim 1 wherein the edible dough envelope comprises a first and a second layer of dough, wherein the first and second layer differ in formulation.

15. The food of claim 1 wherein the food has a major dimension less than about 25 cm and is less than 1000 grams.

16. The food of claim 1 wherein the food is less than 750 grams.

17. The food of claim 1 wherein the food is a sweet food.

18. The food of claim 17 wherein the food is a dessert.

19. The food of claim 1 wherein the food is a savory food.

20. The food of claim 19 wherein the food is an appetizer.

21. The food of claim 20 wherein the appetizer comprises an Oriental flavor.

22. The food of claim 20 wherein the appetizer comprises a Mexican flavor.

23. The food of claim 20 wherein the appetizer comprises a pizza flavor.

24. The food of claim 1 wherein there are two or more stacked portions, the extended portions not in registration.

25. The food of claim 24 wherein the two or more stacked portions comprise two or more different fillings.

26. The food of claim 1 wherein the center portion is substantially circular.

27. The food of claim 1 wherein the dough envelope defining the center portion has a different composition than the dough envelope defining the extended portions.

28. The food of claim 1 wherein the one or more layers of filling are present substantially only within the center portion.

29. A food comprising at least one edible dough layer and at least one or more layers of pizza filling, the food comprising a center portion and a substantially radially symmetrical segmented array of at least three extended and contiguous portions extending from the center portion, each of the extended portions have a layer of filling or topping, the extended portions defined by a radially symmetrical means to separate an extended portion from the central portion, wherein the means to separate comprises at least one score line or line of perforations.

30. The food of claim 29 wherein the food comprises a layer of dough and four or more topped extended portions.

31. The food of claim 30 wherein the center comprises a filled portion.

32. The food of claim 29 wherein the food comprises two layers of dough and where the layers form an enclosure for the filling.

33. The food of claim 29 wherein there are two or more stacked portions, the extended portions not in registration.

34. The food of claim 33, wherein the two or more stacked portions comprise two or more different fillings.

35. The food of claim 29 wherein the food is a par-baked food.

36. The food of claim 29 wherein there are three extended portions.

37. The food of claim 29 wherein there are four extended portions.

38. The food of claim 29 wherein there are five extended portions.

39. The food of claim 29 wherein there are six extended portions.

40. The food of claim 29 wherein there are seven extended portions.

41. The food of claim 29 wherein there are eight extended portions.

42. The food of claim 29 wherein the food extended portions are arcuate, such that a line that extends from the center to the end of the extended portion defines a curved line segment.

43. A food unit comprising at least one edible substantially circular central portion, the food comprising an array of at least three segmented portions comprising an envelope comprising a pizza filling, the segmented portions substantially contiguous and substantially symmetrical around the central portion and each of the extended portions have a layer of filling or topping, the extended portions defined by a radially symmetrical means to separate an extended portion from the central portion, wherein the means to separate comprises at least one score line or line of perforations, the food unit having a major dimension less than 15 cm and a weight less than 750 grams.

44. The food unit of claim 43 wherein the food is configured for toaster cooking.

45. The food unit of claim 43 wherein the food comprises a layer of dough and four or more topped extended portions.

46. The food unit of claim 45 wherein the center comprises a filled portion.

47. The food unit of claim 43 wherein the food comprises two layers of dough and where the layers form an enclosure for the filling.

48. The food unit of claim 43 wherein there are two or more stacked portions, the extended portions not in registration.

49. The food unit of claim 48, wherein the two or more stacked portions comprise two or more different fillings.

50. The food unit of claim 43 wherein the food is a par-baked food.

51. The food unit of claim 50 wherein the extended portions of the par-baked food are arcuate, such that a line that extends from the center to the end of the extended portion defines a curved line segment.

52. The food unit of claim 43 wherein there are three extended portions.

53. The food unit of claim 43 wherein there are four extended portions.

54. The food unit of claim 43 wherein there are five extended portions.

55. The food unit of claim 43 wherein there are six extended portions.

56. The food unit of claim 43 wherein there are seven extended portions.

57. The food unit of claim 43 wherein there are eight extended portions.

58. The food unit of claim 43 comprising the food unit is packaged in a flexible film wrap forming a wrapped unit.

59. The food unit of claim 58 wherein a number of the wrapped units are packaged in a carton.

60. The food unit of claim 29 wherein the food unit has a major dimension less than 15 cm and a weight less than 750 grams.

* * * * *